United States Patent [19]

Ponticello et al.

[11] 4,160,864

[45] Jul. 10, 1979

[54] ADHESIVE COMPOSITIONS COMPRISING METHYL ALLYL METHYLENEMALONATE

[75] Inventors: Ignazio S. Ponticello, Rochester, N.Y.; John M. McIntire, Kingsport, Tenn.

[73] Assignee: Eastman Kodak Company, Rochester, N.Y.

[21] Appl. No.: 721,148

[22] Filed: Sep. 7, 1976

[51] Int. Cl.² .............................................. C07C 69/38
[52] U.S. Cl. ...................................... 560/2; 526/322; 560/201
[58] Field of Search .............................. 526/321–323; 260/485 N; 106/287 R; 560/2, 127, 201

[56] References Cited

U.S. PATENT DOCUMENTS

| 843,401 | 2/1907 | Kronstein | 526/322 |
| 3,197,318 | 7/1965 | Halpern et al. | 106/208 |
| 3,221,745 | 12/1965 | Coover et al. | 128/334 |
| 3,557,185 | 1/1971 | Ito et al. | 260/465.4 |
| 4,049,698 | 9/1977 | Hawkins et al. | 560/201 |
| 4,056,543 | 11/1977 | Ponticello | 560/201 |

*Primary Examiner*—Theodore Morris
*Attorney, Agent, or Firm*—Arthur H. Rosenstein

[57] ABSTRACT

An adhesive composition comprising monomeric methyl allyl methylenemalonate is useful for bonding together a wide range of materials.

5 Claims, No Drawings

ADHESIVE COMPOSITIONS COMPRISING METHYL ALLYL METHYLENEMALONATE

This invention relates to novel adhesive compositions comprising methyl allyl methylenemalonate. The adhesive is rapid-setting and can be used for many purposes.

There has been much work described in the prior art relating to adhesive compositions containing monomeric cyanoacrylates and methylenemalonates. These esters have been found to be outstandingly high-strength adhesives for bonding all kinds of materials, such as glass, metals, plastics and rubber to themselves or to other materials. The mechanism by which the cyanoacrylates and methylenemalonates function as adhesives is not completely understood but it is thought that the adhesive properties are attributed to the rapidity with which thin films of the monomers polymerize. When two surfaces are placed together with a thin film of a monomeric cyanoacrylate or methylenemalonate between them, the monomer rapidly polymerizes and forms an adhesive bond.

Many adhesive compositions known in the art such as alkyl cyanoacrylates as described in U.S. Pat. No. 3,557,185, di-alkyl methylenemalonates such as described in U.S. Pat. No. 3,221,745 and diallyl methylenemalonate such as described in U.S. Pat. No. 3,197,318 are fast setting adhesives. However, the bonding of some materials requires longer setting times, have considerably less shear strength and may suffer from environmental effects.

Accordingly, an object of this invention is to provide adhesive compositions capable of providing long lasting glass to glass and glass to metal bonds.

Another object of this invention is to provide adhesive compositions having a fast set time.

A further object of this invention is to provide adhesive compositions having high shear strength when bonding a variety of materials and having excellent strength even after being subjected to severe weathering conditions.

The above and other objects are surprisingly achieved by using as a component of the adhesive composition a monomeric methyl allyl methylenemalonate having the formula:

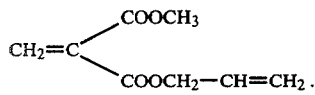

The novel methylenemalonate can be prepared by preparing an endo- and exo-5-alkoxycarbonyl-substituted-2-norbornene using the well-known Diels-Alder reaction by mixing, for example, cyclopentadiene with methyl acrylate at room temperature or, if desired, with heating or use of Lewis catalysts as follows:

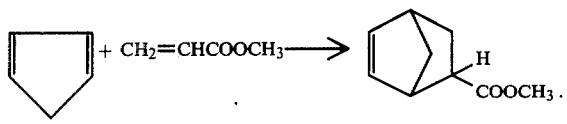

This material can then be reacted with ClCOOCH$_2$—CH=CH$_2$ at approximately equimolar amounts in the presence of an alkyl-substituted lithium amide complex such as lithium N,N-diisopropylamide in a solvent such as tetrahydrofuran.

The reaction can be carried out at a temperature range of from about −78° C. to about −40° C. and preferably at approximately atmospheric pressure.

The resulting compound is then pyrolyzed by heating, for example, by passage through a hot quartz tube packed with quartz chips at elevated temperatures of from about 400° C. to about 800° C. at a pressure within the range of about 1 millimeter to about 760 millimeters Hg pressure in an inert atmosphere.

The above process is described in copending U.S. Application Ser. No. 721,149 filed on even date by I. S. Ponticello entitled "Process of Preparing Substituted Acrylates now U.S. Pat. No. 4,056,543."

A further method of preparation of the methyl allyl methylenemalonate monomer is described in copending U.S. Application Ser. No. 711,924 filed Aug. 5, 1976 by Hawkins, entitled "Process for Producing Methylenemalonic Esters now U.S. Pat. No. 4,049,698."

The adhesive composition can comprise the methyl allyl methylenemalonate alone or it can also comprise other materials such as polymerization inhibitors and polymerization catalysts. Generally, acidic materials inhibit polymerization. Acidic polymerization inhibitors can be utilized in small amounts (e.g., 0.0001 to 0.03% by weight based on the monomer) to stabilize the composition and minimize polymerization of the subject monomers in bulk form during storage. These include various acidic polymerization inhibitors such as sulfur dioxide, hydrogen fluoride, boron trifluoride, nitric oxide, organic acids, organic anhydrides, stannic chloride, ferric chloride, etc. Free radical inhibitors are also useful in this adhesive. Examples of these inhibitors include hydroquinone, p-methoxyphenol, catechol and the like.

The monomeric esters of methylenemalonic acid employed to form the bonding agent in the present invention can be modified with polymeric or resinous material to impart high viscosity thereto, and with plasticizers to improve the flexibility and aging characteristics of the bonds formed between various articles.

The ester of methylenemalonic acid can be applied to the article being bonded as a thin film in a monomeric form. This monomeric ester has substantial stability while in bulk form but rapidly polymerizes when spread in a thin film between the elements to be bonded, and hence, the elements being bonded are immediately brought together in the position to be bonded after the subject monomer is spread therebetween.

A wide variety of materials can be adhered or bonded together in accordance with the invention. The procedure comprises spreading on at least one of the surfaces to be bonded a film of the liquid adhesive composition comprising the methyl allyl methylenemalonate, bringing together the surfaces to be bonded and polymerizing the film of monomer while in contact with such surfaces. The resulting product is a composite or laminated article in accordance with the invention comprising at least two elements bonded together by an adhesive layer formed by the polymerization in situ of the monomeric ester of methylenemalonic acid.

Particularly useful articles of the invention are rigid laminates. Composite articles can be prepared by bonding together such materials as wood, steel, aluminum, brass, copper, glass, rubber, cellulose acetate butyrate, acrylic, polycarbonate, polyvinyl chloride, polyester, and similar materials both to themselves and to other materials. In addition the monomer may be useful in preparing bonds useful to the medical and dental arts, including uses in vascular surgery; bonding tissue, skin and bones; and bonding teeth to tissue and bones in the mouth.

The following examples are presented.

EXAMPLE 1

To a solution of N-isopropylcyclohexylamine (141 g, 1 mole) in tetrahydrofuran (1 l.) at 0° C. was added n-butyllithium (1 mole) in hexane. Then endo- and exo-5-carbomethoxy-2-norbornene (152 g, 1 mole) was added dropwise at −78° C. and the solution of the anion was stirred at −78° C. for an additional 15 minutes. Finally, allyl chloroformate (120.5 g, 1 mole) was added dropwise at −78° C. and the reaction mixture was stirred at this temperature for 30 minutes. The mixture was poured onto cracked ice containing hydrochloric acid (125 ml). The organic layer was separated and the aqueous layer was extracted with four 200 ml portions of diethyl ether. The combined organic extracts were washed with saturated bicarbonate solution, dried, filtered and the solvent removed.

The above resulting norbornene (100 g) was added over 2 hours at the top of a vertical quartz tube (1 ft. × 1 in.) packed with quartz chips kept at 650° C. The crude product was collected under reduced pressure (2-4 mm) in a receiver cooled at −20° C. (carbon tetrachloride/Dry Ice). The material was distilled (58° C./0.25 mm) giving methyl allyl methylenemalonate.

EXAMPLE 2

This example demonstrates the unique and unexpected properties of methyl allyl methylenemalonate as a fast setting adhesive and shows the markedly superior resistance to weathering over adhesives of closely related prior art methylenemalonate and cyanoacrylate adhesives.

Hot-rolled steel-to-steel bonds having one-half square inch areas were prepared from methyl allyl methylenemalonate (MAMM), methyl ethyl methylenemalonate (MEMM), and methyl 2-cyanoacrylate (MCA). These bonds were mounted in an XWR Weather-Ometer and were subjected to accelerated weathering conditions. The average lap shear strengths of three bonds removed from the XWR Weather-Ometer after being subjected to accelerated weathering for the time indicated are shown below:

TABLE I

| Time | MAMM | MEMM | MCA |
|---|---|---|---|
| 0 hr | 800 psi | 964 psi | 686 psi |
| 100 hr | 1138 psi | 748 psi | 0 |
| 200 hr | 1680 psi | 738 psi | |
| 400 hr | 1912 psi | 728 psi | |
| 800 hr | 2112 psi | 0 | |
| 1600 hr | 2018 psi | | |

Under these conditions, which are described in ASTM Procedure Designation G23-69, it is expected that approximately 400 hours are equivalent to one year of outdoor exposure.

Lap shear strength was tested using the procedure described in ASTM Designation D1002.

EXAMPLE 3

The bonding properties of methyl allyl methylenemalonate with various substrates are compared to those of dimethyl methylenemalonate (DMMM) and methyl 2-cyanoacrylate (MCA) by subjecting the bonds to aging conditions at 50° C. The following average lap shear strengths of the bonds were obtained after the periods indicated:

TABLE II

| Substrates | MAMM | DMMM | MCA |
|---|---|---|---|
| Glass-Glass | 249 psi | 66 psi | 123 psi |
| Glass-Steel | 601 psi | 83 psi | <1 psi |
| Glass-Aluminum | 561 psi | 224 psi | <1 psi |
| 30 Days at 50° C. | | | |
| Glass-Glass | 193 psi | 53 psi | 61 psi |
| Glass-Steel | 498 psi* | 230 psi | 216 psi |
| Glass-Aluminum | 621 psi* | 78 psi | 91 psi |
| 60 Days at 50° C. | | | |
| Glass-Glass | 254 psi | 141 psi | 160 psi |
| Glass-Steel | 544 psi | 137 psi | 260 psi |
| Glass-Aluminum | 525 psi | 35 psi | 0 |
| 90 Days at 50° C. | | | |
| Glass-Glass | 268 psi | 139 psi | 101 psi |
| Glass-Steel | 296 psi* | 302 psi | 97 psi |
| Glass-Aluminum | 809 psi* | 150 psi | 117 psi |

*Bond held, substrate failed.

EXAMPLE 4

The durability of glass bonds prepared using the methyl allyl methylenemalonate of the invention and monomers of the prior art, allyl 2-cyanoacrylate (ACA) and methyl 2-cyanoacrylate (MCA), were tested by bonding 5 microscope slides with each adhesive and subjecting to simulated dishwasher conditions (70° C. in soapy water for 30 minutes, 70° C. in rinse water for 30 minutes and 100° C. in drying oven for 30 minutes). The durability of the glass bonds is shown in Table III:

TABLE III

| | Number of Failures (Total) | | |
|---|---|---|---|
| Number of Wash Cycles | MAMM | ACA | MCA |
| 1 | 0 | 1 | 0 |
| 2 | 0 | 5 | 0 |
| 3 | 0 | 5 | 1 |
| 4 | 0 | 5 | 1 |
| 5 | 0 | 5 | 2 |
| 6 | 0 | 5 | 2 |
| 7 | 0 | 5 | 3 |
| 8 | 0 | 5 | 3 |
| 9 | 0 | 5 | 3 |
| 10 | 2* | 5 | 3 |

*Agitator is believed to have broken substrates.

EXAMPLE 5

The bonding strength with various laminae of methyl allyl methylenemalonate was compared to the prior art diallyl methylenemalonate (DAMM) by placing a free fall drop of the adhesive dispensed from a 26 gauge syringe needle on one substrate and measuring the time required to form a firm bond between the two substrates as indicated by gentle hand pressure and the lap shear strength of these bonded substrates after 24 hours. The results are shown below in Table IV:

TABLE IV

| Substrates | DAMM Set Time, sec. | DAMM Lap Shear Strength* psi | MAMM Set Time, sec. | MAMM Lap Shear Strength* psi |
|---|---|---|---|---|
| Glass/Glass | 3 | 57 | 1–2 | 250 |
| Steel/Steel | >300 | 45 | 20 | 1425 |
| Aluminum/Aluminum | 30 | 24 | 5 | 964 |
| Glass/Steel | 15 | 61 | 2–3 | 447 |
| Glass/Aluminum | 15 | 60 | 2–3 | 561 |

*Average of three breaks

EXAMPLE 6

The bonding strength of methyl allyl methylenemalonate and diallyl methylenemalonate were tested for their resistance to weathering by preparing one-half square inch area bonds with steel to steel and subjecting to accelerated weathering in an XWR Weather-Ometer. After 24 hours all of the bonds using diallyl methylenemalonate as the adhesive had fallen apart. Methyl allyl methylenemalonate bonds remained strong for over 1600 hours.

Glass to glass, glass to steel and glass to aluminum bonds were prepared from methyl allyl methylenemalonate and diallyl methylenemalonate and subjected to accelerated aging conditions (50° C.). The diallyl methylenemalonate bonds broke apart in less than 30 days. The corresponding bonds using methyl allyl methylenemalonate were still strong after 30 days testing.

Although the invention has been described in detail with particular reference to certain preferred embodiments thereof, variations and modifications can be effected within the spirit of the invention as described hereinabove.

We claim:

1. An adhesive composition which comprises a monomeric ester having the formula

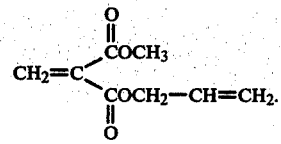

2. The composition of claim 1 also including polymerization inhibitors.

3. The composition of claim 2 wherein the polymerization inhibitor is hydroquinone.

4. The composition of claim 2 wherein the polymerization inhibitor is p-methoxyphenol.

5. The composition of claim 2 wherein the polymerization inhibitor is present in an amount of from about 0.005 up to about 0.10% by weight based on the weight of the ester.

* * * * *